(12) United States Patent
Ohtomo et al.

(10) Patent No.: US 7,092,076 B2
(45) Date of Patent: Aug. 15, 2006

(54) SURVEYING INSTRUMENT

(75) Inventors: Fumio Ohtomo, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 35 days.

(21) Appl. No.: 10/812,439

(22) Filed: Mar. 30, 2004

(65) Prior Publication Data

US 2004/0207832 A1 Oct. 21, 2004

(30) Foreign Application Priority Data

Apr. 15, 2003 (JP) ............................. 2003-110755

(51) Int. Cl.
*G01C 3/08* (2006.01)
(52) U.S. Cl. .................. 356/4.01; 356/4.01; 356/3.01; 356/3.1; 356/8; 356/11
(58) Field of Classification Search ............... 356/4.01
See application file for complete search history.

(56) References Cited

U.S. PATENT DOCUMENTS

| | | | |
|---|---|---|---|
| 4,040,740 A | 8/1977 | Handtmann et al. ........... 356/4 |
| 5,568,263 A * | 10/1996 | Hanna ........................ 356/638 |
| 5,905,592 A | 5/1999 | Gohdo et al. ............... 359/424 |
| 5,978,335 A * | 11/1999 | Clark et al. .............. 369/53.34 |
| 6,476,943 B1 * | 11/2002 | Yertoprakhov ............... 359/15 |
| 6,493,067 B1 * | 12/2002 | Kodaira et al. ............ 356/4.08 |

FOREIGN PATENT DOCUMENTS

| | | |
|---|---|---|
| EP | 0 429 012 | 5/1991 |
| JP | 10-132557 | 5/1998 |

* cited by examiner

*Primary Examiner*—Thomas H. Tarcza
*Assistant Examiner*—Luke D. Ratcliffe
(74) *Attorney, Agent, or Firm*—Nields & Lemack

(57) ABSTRACT

A surveying instrument, comprising a collimation optical system and a visible laser projecting device with a visible laser light source unit for emitting a point light, wherein the surveying instrument comprises a photodetector for detecting a reflection light entering from the collimation optical system, and a control means for controlling light emission of the visible laser light source unit based on a detection result of the photodetector.

8 Claims, 2 Drawing Sheets

US 7,092,076 B2

SURVEYING INSTRUMENT

BACKGROUND OF THE INVENTION

The present invention relates to a surveying instrument enabling to confirm a collimating point and a target by emitting a visible point light and by confirming a projecting position of the point light.

When surveying operation is carried out at a building site or a construction site, a surveying instrument provided with a visible laser projecting device is often used to confirm a collimating point of the surveying instrument or to identify a target for surveying.

In the surveying instrument, a visible laser beam projected from the visible laser projecting device fulfills a function of a point light to indicate a point to be measured for an operator at the surveying target. The operator performs operation such as marking of a measuring point at the position indicated by the visible laser beam.

In particular, when operation is to be performed in dark conditions such as in a tunnel, a measuring position can be clearly defined by projecting a point light. For instance, excavating operation is carried out according to a projecting point of the point light.

FIG. 4 is a block diagram showing a surveying instrument provided with a visible laser projecting device.

It is designed in such a structure that the visible laser beam is projected along a collimation axis of a telescope as a light to be projected to a collimation point. A semiconductor laser is now used instead of a conventional gas laser type light source, and the visible laser projecting device and the visible laser beam can be incorporated in the surveying instrument.

First, description will be given on a collimation optical system 1.

The collimation optical system 1 comprises a collimation optical axis 2. On the collimation optical axis 2, there are provided an objective lens 3, a focusing lens 4, an erect image prism 5, a focal plate 6, and an ocular lens 7. By moving the focusing lens 4 along the collimation optical axis 2, an image of a collimation point is formed on the focal plate 6 under focused condition.

A polarization beam splitter 8 is provided between the focusing lens 4 and the erect image prism 5. The polarization beam splitter 8 has a polarizing reflection surface 8a. The polarizing reflection surface 8a reflects a s-polarized light and allows a p-polarized light to pass, for instance.

Next, a visible laser projecting device 9 has a projection optical axis 10. The projection optical axis 10 crosses the collimation optical axis 2 within the plane of the polarizing reflection surface 8a and commonly shares (with the collimation optical axis 2) a portion closer to the collimation target from the polarization beam splitter 8.

On the visible laser projecting device 9, there is provided a semiconductor laser 11, which serves as a light source to emit the visible laser beam. A condenser lens 12 is disposed between the semiconductor laser 11 and the polarization beam splitter 8. In this case, the output from the semiconductor laser 11 is limited to about several milliwatts because the laser beam has directivity and high energy density.

In the surveying instrument as described above, a collimation light from a target for surveying forms an image on the focal plate by the objective lens 3 and the focusing lens 4, and the surveying operator can see the image of the target for surveying on the focal plate 6 via the ocular lens 7.

The point light from the visible laser projecting device 9 is a s-polarized light. It is reflected by the polarizing reflection surface 8a and is projected to the target for surveying through the focusing lens 4 and the objective lens 3.

The visible laser beam reflected by the target for surveying passes through the objective lens 3 and the focusing lens 4 and reaches the polarizing reflection surface 8a. When the visible laser beam is reflected by the target for surveying, uniformity of the polarization is disrupted, and the reflected visible laser beam contains a p-polarized component. Therefore, the p-polarized component of the reflected visible laser beam passes through the polarizing reflection surface 8a. The surveying operator can recognize the reflected visible laser beam and can confirm the projecting position of the visible laser beam on the target for surveying.

A surveying instrument with the above arrangement is described, for instance, in JP-A-10-132557.

When the target for surveying is made of a retroreflection prism or there is an object such as glass with high reflectivity in the measuring direction, and if the visible laser beam is reflected by the retroreflection prism or the glass, etc., the surveying operator must directly see the strong visible laser beam converged via the collimation optical system 1.

As described above, the output of the visible laser beam is low in itself, but the laser beam has directivity and high energy density. When the surveying operator directly sees the visible laser beam, he may feel dizziness. Also, after directly seeing the visible laser beam, the operator is often turned to a condition not suitable for adequate operation because of an afterimage remaining for some time.

There is another type of surveying instrument, in which a distance is measured by a visible light instead of a visible laser beam. In such type of surveying instrument, the operator often directly sees a distance-measuring light reflected by a prism. In such case, the surveying operator often feels dizziness in the same matter, or is turned to a condition not suitable for operation because of an afterimage.

In the conventional type surveying instrument as described above, a visible laser projecting device is used to illuminate a point to be measured. In case the visible laser projecting device emits a point light to indicate a measuring point, light density is increased. When the surveying operator directly sees the reflected point light, he may feel much higher dizziness.

SUMMARY OF THE INVENTION

It is an object of the present invention to provide a surveying instrument provided with a collimation telescope and a visible laser projecting device with a visible laser light source for emitting a point light, which makes it possible to prevent a surveying operator from directly seeing a reflected light of a visible laser beam or a visible distance-measuring light.

To attain the above object, the surveying instrument according to the present invention comprises a collimation optical system and a visible laser projecting device with a visible laser light source unit for emitting a point light, wherein the surveying instrument comprises a photodetector for detecting a reflection light entering from the collimation optical system, and a control means for controlling light emission of the visible laser light source unit based on a detection result of the photodetector. Also, the present invention provides the surveying instrument as described above, wherein the photodetector is a point light photodetector for detecting the point light entering as a reflection light, and the control means controls light emission of the visible laser light source unit based on detection of the point light photodetector. Further, the present invention provides the surveying instrument as described above, wherein the control means drives or stops the light emission of the visible laser light source unit. Also, the present invention provides the surveying instrument as described above, wherein the control means adjusts a light amount of the light emitted from the visible laser light source unit. Further, the present invention provides the surveying instrument as described above, further comprising a distance-measuring unit, wherein a distance-measuring light photodetector of the distance-measuring unit also serves as the point light photodetector.

Also, the present invention provides the surveying instrument as described above, further comprising a distance-measuring unit for emitting a distance-measuring light and for measuring a distance from the reflected distance-measuring light, wherein the distance-measuring unit comprises a distance measuring light photodetector for receiving the reflected distance-measuring light, and the control unit controls light emission of the visible laser light source unit under the condition where the distance-measuring light photodetector receives the reflected distance-measuring light. Further, the present invention provides the surveying instrument as described above, wherein the control means adjusts a light amount of the light emitted from the visible laser light source unit. Also, the present invention provides the surveying instrument as described above, wherein the distance-measuring unit has a light amount adjusting filter for adjusting a light amount of the distance-measuring light, and light emitting condition of the visible laser light source unit is controlled according to an adjustment amount of the light amount adjusting filter.

DETAILED DESCRIPTION OF THE PREFERRED EMBODIMENTS

Figure 1:
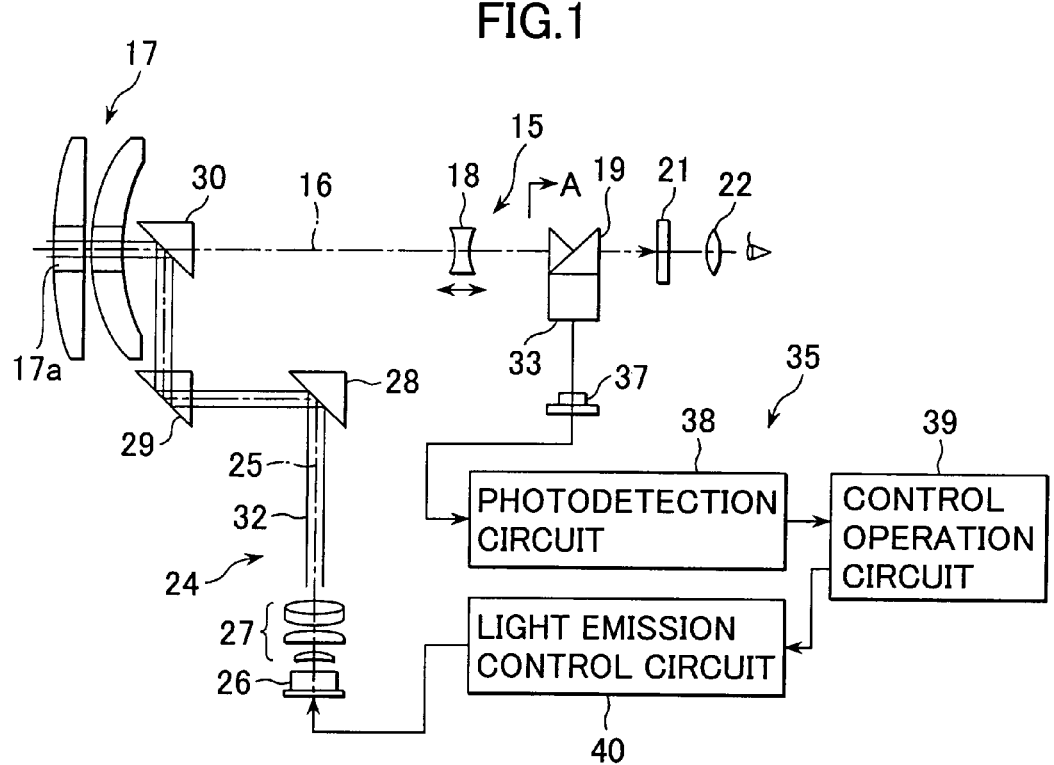
FIG. 1 is a schematical block diagram of an essential portion of a first embodiment of the present invention.

Description will be given below on embodiments of the present invention referring to the drawings.

Referring to FIG. 1, description will be given on a first embodiment.

FIG. 1 shows an essential portion of a surveying instrument. The surveying instrument comprises a collimation optical system 15, a visible laser projecting device 24, and a control unit 35.

First, the collimation optical system 15 is described.

The collimation optical system 15 comprises a collimation optical axis 16. On the collimation optical axis 16, there are provided a perforated objective lens 17, a focusing lens 18, an erect image prism 19, a focal plate 21, and an ocular lens 22. By moving the focusing lens 18 along the collimation optical axis 16, an image at a collimation point is formed on the focal plate 21 under focused condition. A surveying operator can see an image of a target for surveying on the focal plate 21 through the ocular lens 22.

Next, the visible laser projecting device 24 has a projecting light optical axis 25.

On the projecting light optical axis 25, there are provided a laser diode 26, a collimator lens 27, reflection prisms 28 and 29, and a half-mirror 30. The half-mirror 30 is placed at a position on the collimation optical axis 16 opposite to an aperture 17a of the perforated objective lens 17. A visible laser beam emitted from the laser diode 26 is deflected by the reflection prisms 28 and 29 and by the half-mirror 30 so that the visible laser beam is projected coaxially with the collimation optical axis 16.

A point light 32 emitted from the laser diode 26 is reflected by the reflection prisms 28 and 29 and by the half-mirror 30. The projecting light optical axis 25 is aligned with the collimation optical axis 16, and the point light 32 is projected through the aperture 17a.

Now, description will be given on the control unit 35.

Figure 2:
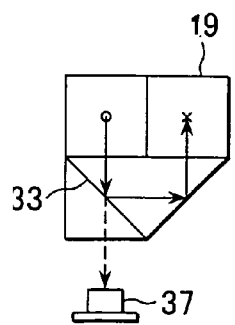
FIG. 2 is an arrow diagram along a line A in FIG. 1.

The erect image prism 19 reflects the light beam entering from the left in FIG. 1 by four times, i.e. in a downward direction in the figure, perpendicularly to the paper surface, in an upward direction, and in a rightward direction. Thus, an erect reflection image is formed on the focal plate 21. FIG. 2 is an arrow diagram along the line A in FIG. 1. In FIG. 2, a light beam entering the paper surface from a direction perpendicular to the paper surface is reflected by four times, i.e. in a downward direction, in a rightward direction, in an upward direction, and in a direction perpendicular to the paper surface. The erect image prism 19 has four reflection surfaces. On one arbitrary surface of these reflection surfaces, a wavelength selecting film 33 is formed, which allows a part of only the wavelength of the point light 32 to pass.

A photodetector 37 is provided at a position opposite to the wavelength selecting film 33, and the photodetector 37 receives the visible laser beam passing through the wavelength selecting film 33. A photodetection signal from the photodetector 37 is inputted to a photodetection circuit 38. An identification result of photodetection by the photodetection circuit 38 is inputted to a control operation circuit 39. Based on the identification result of the photodetection circuit 38, light emission of the laser diode 26 is controlled via a light emission control circuit 40.

The point light 32 (visible laser beam) emitted from the laser diode 26 is turned to parallel luminous fluxes by the collimator lens 27, and is projected though the aperture 17a by the reflection prisms 28 and 29 and by the half-mirror 30.

An operator at a surveying point can confirm a direction of collimation of the collimation optical system 15 by watching a projecting position of the point light 32. By confirming an image formed on the focal plate 21 through the ocular lens 22, the surveying operator can confirm a collimating point.

A reflection light of the point light 32 passes through the half-mirror 30 and the wavelength selecting film 33 and enters the photodetector 37. The photodetector 37 issues a signal, which corresponds to intensity of the reflection light entering the photodetector 37, and the photodetection circuit 38 identifies a level of the photodetection signal. When the point light 32 is projected to a portion with low reflectivity, the intensity of the signal from the photodetector 37 is low, and the photodetection circuit 38 judges that the level of the photodetection signal is lower than a reference value. Based on the judgment of the level by the photodetection circuit 38, the control operation circuit 39 controls the light emission control circuit 40, and the laser diode 26 is driven so as to emit the point light 32 in steady state.

In case the target for surveying has a retroreflection prism such as a corner cube or a strong reflection surface such as a glass or a metal mirror surface, a reflection light of the point light 32 with high intensity is received by the photodetector 37. The photodetector 37 issues a strong photodetection signal to the photodetection circuit 38. The photodetection circuit 38 judges that the photodetection signal is above a predetermined level, and the judgement result is inputted to the control operation circuit 39. Based on the signal from the photodetection circuit 38, the control operation circuit 39 controls the light emission control circuit 40, and light emission from the laser diode 26 is temporarily stopped. Or, the intensity of the light emitted from the laser diode 26 is reduced.

Because light emission from the laser diode 26 is temporarily stopped or reduced, the surveying operator who sees the image of the target for surveying on the focal plate 21 does not perceive the reflected point light 32 and does not feel dizziness.

The stopping of the light emission from the laser diode 26 is cancelled after a predetermined time has elapsed, and the light is emitted in steady state again from the laser diode 26. Further, if the intensity of the light received by the photodetector 37 is higher than the predetermined level, the stopping of the control of the laser diode 26 is repeated. If the light intensity is lower than the predetermined level, it is restored to the light emission in steady state.

In order to reduce the intensity of the light emitted from the laser diode 26, the photodetection circuit 38 detects the level of the light emission when light intensity is reduced. When the intensity of the received light is decreased to lower than the predetermined level, the result of the level detection is inputted to the control operation circuit 39. Based on the detection result from the photodetection circuit 38, the control operation circuit 39 restores the light emission from the laser diode 26 to steady state via the light emission control circuit 40.

The surveying operator who collimates the target for surveying through the ocular lens 22 does not directly see the point light 32 reflected by the retroreflection prism and the like. The surveying operator does not feel dizziness and is prevented from falling into a condition where the surveying operator cannot continue to operate due to an afterimage.

In the first embodiment of the invention, the wavelength selecting film 33 is formed on one of the reflection surfaces of the erect image prism 19 as optical means for splitting a part of the point light 32, while an optical means for reflecting a part of only the wavelength of the point light 32 may be provided on the collimation optical axis 16, and the photodetector 37 may be arranged on the optical means.

Figure 3:
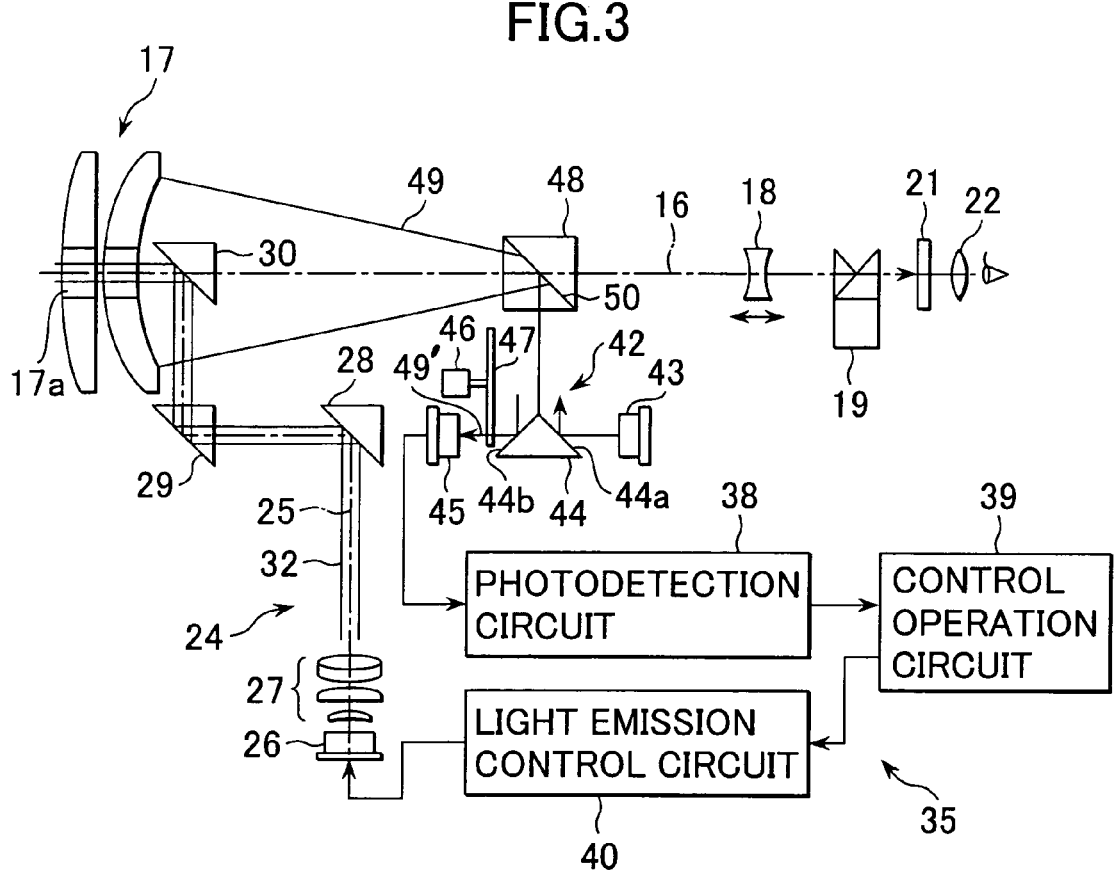
FIG. 3 is a schematical block diagram of an essential portion of a second embodiment of the present invention.
Figure 4:
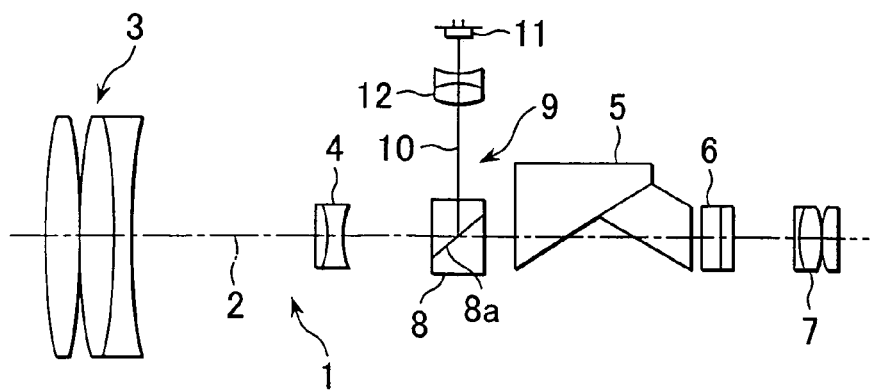
FIG. 4 is a schematical block diagram of an essential portion of a conventional example.

FIG. 3 shows a second embodiment of the invention, showing a case where the present invention is applied to a range-finder or a distance measuring device which projects a point light.

In FIG. 3, the same component as shown in FIG. 1 is referred by the same symbol, and detailed description is not given here.

A distance-measuring optical system 42 is provided between the half-mirror 30 and the focusing lens 18.

The distance-measuring optical system 42 is positioned between the half-mirror 30 and the focusing lens 18 and comprises a dichroic prism 48 arranged on the collimation optical axis 16. The dichroic prism 48 comprises a wavelength selecting film 50. The wavelength selecting film 50 reflects a distance-measuring light 49 and allows the point light 32 and a collimation light (not shown) entering from the target for surveying to pass.

A triangular reflection mirror 44 is arranged at a position opposite to the wavelength selecting film 50. The triangular reflection mirror 44 faces to the wavelength selecting film 50 and has two reflection surfaces 44a and 44b which perpendicularly cross each other. A distance-measuring light source 43 for emitting the distance-measuring light 49 is provided at a position opposite to the reflection surface 44a, and a photodetector 45 is disposed at a position opposite to the reflection surface 44b. The distance-measuring light 49 may be a visible light or a non-visible light. Preferably, a non-visible light is used.

A light amount adjusting filter 47 is arranged between the reflection surface 44b and the photodetector 45 to interrupt an optical axis, and the light amount adjusting filter 47 is rotated by an actuator 46 for light amount adjustment such as a motor.

The distance-measuring optical system 42 comprises an internal reference optical system (not shown).

The point light 32 emitted from the laser diode 26 is reflected by the reflection prisms 28 and 29 and by the half-mirror 30. The projection optical axis 25 is aligned with the collimation optical axis 16, and the point light 32 is projected through the aperture 17a.

The collimation light from the target for surveying forms an image on the focal plate 21 by the perforated objective lens 17 and the focusing lens 18, and the surveying operator can see an image of the target for surveying on the focal plate 21 through the ocular lens 22. Also, via the ocular lens 22, the surveying operator can see a projecting point (collimation point) where the point light 32 is projected.

The distance-measuring light 49 emitted from the distance-measuring light source 43 is reflected by the reflection surface 44a and is further reflected by the wavelength selecting film 50. The distance-measuring light 49 is then turned to a parallel luminous flux by the objective lens 17 and is projected.

After being reflected by the target for surveying, the distance-measuring light 49 enters the perforated objective lens 17. The distance-measuring light 49 passes through the perforated objective lens 17 and is reflected by the wavelength selecting film 50 and the reflection surface 44b and is converged to a photodetection surface of the photodetector 45.

The photodetector 45 receives alternately a light beam from the internal reference optical system and a reflected distance-measuring light 49'. A distance measurement arithmetic unit (not shown) calculates a distance to the target for surveying based on phase difference between the two.

The light intensity of the reflected distance-measuring light 49' differs according to the distance and properties of the reflection surface of the target for surveying. The light amount adjusting filter 47 adjusts a transmitting light amount of the reflected distance-measuring light 49' so that the reflected distance-measuring light 49' has the same light intensity as the light intensity of the internal reference light.

When the photodetector 45 detects the reflected distance-measuring light 49', calculation for distance measurement is performed as described above, and the photodetection signal is inputted to the photodetection circuit 38. Then, the signal from the photodetector 45 is inputted, the photodetection circuit 38 stops emission of the point light 32 from the laser diode 26 via the light emission control circuit 40.

A width of luminous flux of the reflected distance-measuring light 49' is sufficiently wider than a width of luminous flux of the point light 32. Thus, the driving of the laser diode 26 can be stopped before the point light 32 enters from the aperture 17a.

When the photodetector 45 does not receive the reflected distance-measuring light 49' any more, there is no more photodetection signal from the photodetector 45, and the photodetection circuit 38 gives such notification to the control operation circuit 39 that the reflected distance-measuring light 49' is not received. The control operation circuit 39 drives the laser diode 26 again via the light emission control circuit 40, and the point light 32 is emitted.

The surveying operator does not directly see the point light 32 and does not feel dizziness. The surveying operator is prevented from falling into a condition not suitable for operation due to an afterimage.

In the second embodiment, the photodetection circuit 38 judges whether the photodetector 45 has received the reflected distance-measuring light 49' or not and controls the driving or stopping of the laser diode 26. The stopping or driving of the laser diode 26 may be controlled by the detection of an amount of light amount adjustment by the light amount adjusting filter 47 (or an amount of rotation or a rotating position of the actuator 46).

Specifically, in the light amount adjusting filter 47, the transmitting light amount is adjusted so that the light amount received by the photodetector 45 is approximately at a constant level. However, the magnitude of the light amount of the reflected distance-measuring light 49' corresponds to the magnitude of the light amount of the point light 32. Accordingly, by driving or stopping the laser diode 26 or by adjusting the light emission amount of the laser diode 26 according to the amount of light amount adjustment of the light amount adjusting filter 47, the surveying operator can avoid direct watching on the point light 32, or the surveying operator is prevented from feeling dizziness when he directly sees the point light 32.

The photodetector 45 is a component to make up the distance-measuring optical system 42, while it may be separately provided for detection of the reflected distance-measuring light 49' for the purpose of controlling the laser diode 26. In the second embodiment, the wavelength selecting film 33 may be provided on the erect image prism 19 similarly to the first embodiment. The photodetector 37 (FIG. 1) may be provided at a position opposite to the wavelength selecting film 33. A part of the point light 32 is split by the wavelength selecting film 33 and the point light 32 is detected by the photodetector 37 so that the stopping or driving of the laser diode 26 or light emission control of the laser diode 26 can be carried out.

If it is designed in such manner that the wavelength selecting film 50 splits a part of the point light 32 and reflects it, the photodetection circuit 38 can input such notification to the control operation circuit 39 that the photodetector 45 has received the point light 32 or not. Based on the judgment on the receiving of the point light 32 by the photodetection circuit 38, the control operation circuit 39 can stop or drive the laser diode 26.

The present invention provides a surveying instrument, comprising a collimation optical system and a visible laser projecting device with a visible laser light source unit for emitting a point light, wherein the surveying instrument comprises a photodetector for detecting a reflection light entering from the collimation optical system, and a control means for controlling light emission of the visible laser light source unit based on a detection result of the photodetector. As a result, a surveying operator engaging in collimation of a target for surveying is prevented from feeling dizziness due to the reflected point light and from falling into a condition not suitable for operation due to an afterimage.

What is claimed is:

1. A surveying instrument, comprising a collimation optical system having an optical axis and a visible laser projecting device with a visible laser light source unit for emitting a visible laser point light to said collimation optical axis of said collimation optical system, wherein said surveying instrument comprises a photodetector for detecting said point light, a wavelength selecting means for selectively transmitting said point light, an optical means having said wavelength selecting means and for selectively allowing said point light, which is projected from said collimation optical system, to pass and for directing said point light to said photodetector, and a control means for controlling the light emitting condition of said visible laser light source unit based on a detection result of said photodetector when a photodetection signal from said photodetector is above a predetermined level.

2. A surveying instrument according to claim 1, wherein said control means drives or stops the light emission of said visible laser light source unit.

3. A surveying instrument according to claim 1, wherein said control means reduces the intensity of the light emitted from said visible laser light source unit.

4. A surveying instrument according to claim 1, wherein said optical means comprises an erect image prism having a plurality of reflection surfaces, and said wavelength selecting means is formed on one of said reflection surfaces of said erect image prism.

5. A surveying instrument, comprising a collimation optical system and a visible laser projecting device with a visible laser light source unit for emitting a visible laser point light to a collimation optical axis of said collimation optical system, wherein said surveying instrument comprises a distance measuring optical system for emitting a distance measuring light which has a width wider than a width of the point light to the collimation optical axis, a wavelength selecting means for selectively dividing the distance measuring light, an optical means for selectively directing the distance measuring light which is projected from said collimation optical system to said distance measuring optical system by said wavelength selecting means, and a control means for controlling the light emitting condition of said visible laser light source unit in case said distance measuring optical system receives the distance measuring light.

6. A surveying instrument according to claim 5, wherein said control means reduces the intensity of the light emitted from said visible laser light source unit.

7. A surveying instrument according to claim 5, wherein said control means reduces the intensity of the light emitted from said visible laser light source unit in case said distance measuring optical system receives the distance measuring light.

8. A surveying instrument according to claim 5, wherein said distance measuring optical system comprises a light intensity adjusting filter for adjusting a photodetection light intensity of the distance measuring light, the amount of the adjustment of said light intensity adjusting filter is detected, and said control means controls the light emitting condition of said visible laser light source unit based on the detection.

* * * * *